United States Patent [19]

Ogasawara

[11] 4,414,582
[45] Nov. 8, 1983

[54] MULTIPLE LINE PROCESSING OF VIDEO SIGNALS IN A SCANNING TYPE DOCUMENT READER

[75] Inventor: Satoru Ogasawara, Kanagawa, Japan
[73] Assignee: Fuji Xerox Co., Ltd., Tokyo, Japan
[21] Appl. No.: 337,551
[22] Filed: Jan. 6, 1982

[30] Foreign Application Priority Data

Jan. 9, 1981 [JP] Japan .................................. 56-1904

[51] Int. Cl.³ ............................................. H04N 1/40
[52] U.S. Cl. .................................. 358/282; 358/284; 358/288; 382/50
[58] Field of Search ....................... 358/288, 282, 284; 382/50

[56] References Cited

U.S. PATENT DOCUMENTS 3,194,884  7/1965  Ross ..................................... 358/284
3,675,201  7/1972  McKissick ........................... 358/282
4,237,481 12/1980  Aughton ............................. 358/284

OTHER PUBLICATIONS

*IBM Technical Disclosure Bulletin*, vol. 21, No. 1, Jun. 1978, pp. 113-114, "Gain Compensation System for Image Scanners".

Primary Examiner—Howard Britton
Attorney, Agent, or Firm—Sughrue, Mion, Zinn, Macpeak & Seas

[57] ABSTRACT

The processing circuitry provided for each of a plurality of simultaneously scanned lines is simplified by generating one control signal from the first line and the using that control signal in the processing circuitry for the remaining lines, thus eliminating the need for separate control signal generation for each line.

9 Claims, 3 Drawing Figures

MULTIPLE LINE PROCESSING OF VIDEO SIGNALS IN A SCANNING TYPE DOCUMENT READER

BACKGROUND OF THE INVENTION

The present invention relates to an original document reader, and more particularly to an automatic background correction or an automatic amplitude control circuit for use in an original document reader capable of simultaneously scanning a plurality of lines on an original document to read information thereon.

In original document readers for use in a facsimile system and the like, it is known to simultaneously scan a plurality of lines to read information thereon. In this case, a different automatic background correction circuit or automatic amplitude control circuit is provided for the video signal output representative of an information on each respective line. Therefore, the number of circuit elements contained in an entire system becomes large, resulting in large-scale circuit construction and an increase in the manufacturing cost.

SUMMARY OF THE INVENTION

Accordingly, in view of the above, an object of the present invention is to reduce the number of circuit elements constituting an original document reader capable of simultaneously scanning and reading a plurality of lines carrying information.

The foregoing and other objects of the present invention are met by the provision of a multiline concurrent scanning type original document reader in which a control signal produced by a video signal processing circuit for one scanning line is applied to video signal processing circuits for the other scanning lines, thus making it unnecessary for the processing circuit for other lines to produce their own control signals. Due to this significant feature of the invention, the number of elements constituting the above described video signal processing circuits for the other scanning lines can be reduced, as a result of which the size of the circuit is decreased. Further, the manufacturing cost of the circuit can be reduced.

In a preferred embodiment according to the present invention, the video signal processing circuit for one scanning line includes an automatic background correction circuit which operates to produce a control signal so as to carry out an automatic background correction operation. In this case, the circuit construction may be so designed that the control signal, which is proportional to the background illumination, is applied to a reference signal terminal of a comparator provided in the video signal processing circuits for the other scanning lines, whereby a black signal which has been subjected to an automatic background correction can be accurately detected. Alternatively, the video signal processing circuits for the other scanning lines may be provided with respective variable gain scanning control circuits, and the control signal may be applied to the control terminals of each of the circuits to thereby output a video signal for each line which has been subjected to an automatic background correction.

Furthermore, an automatic amplitude control can be achieved by providing the video signal processing circuit for one scanning line with an automatic amplitude control circuit and applying the control signal produced from the automatic amplitude control circuit for one line to the video signal processing circuits for the other scanning lines.

The video signal processing circuit for one scanning line may be so arranged as to process a video signal representative of information on the first line within a plurality of simultaneously scanned lines, and the information on the remaining lines can be processed in accordance with the video signal processing signal for one scanning line prior to the reading operation of the first information on the first line.

BRIEF DESCRIPTION OF THE DRAWINGS

Hereinafter, concrete examples of the present invention will be described with reference to the accompanying drawings, in which.

DETAILED DESCRIPTION OF THE INVENTION

In facsimile systems using a rotation drum, it is well known in the art to provide a white line skip function. According to this white line skip function, the existence of a white line is decided prior to the scanning and reading operation of a line to be transmitted, and the decision is then stored in memory. Subsequently, the scanning and reading operation is controlled in accordance with the stored decision, so that in the case where a white line is detected, the detected white line can be skipped. The invention will be described in the context of such a white line skip operation wherein it is necessary to simultaneously detect a plurality of lines, although the invention is not limited only to such an application.

Figure 1:
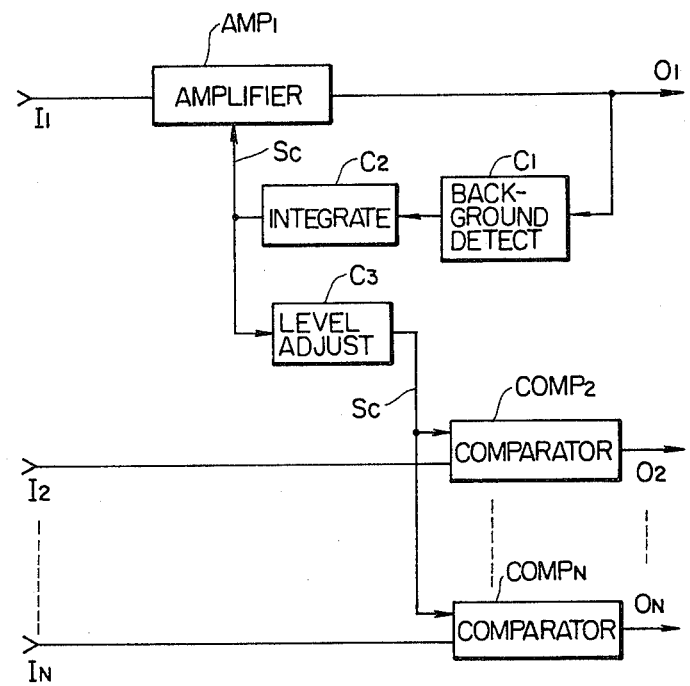
FIG. 1 is a circuit diagram showing one preferred embodiment of an automatic background correction circuit according to the present invention.

In FIG. 1, a video signal $I_1$ representative for information on a line to be transmitted is amplified by a variable gain amplifier $AMP_1$ to be outputted as a video is also applied to a background signal level detector $C_1$, the output signal of which is then applied to an integrating circuit $C_2$ to produce a gain control signal Sc. The gain control signal Sc is applied to a control terminal of the variable gain amplifier to carry out an automatic background correction.

While this is being carried out, the following lines must be simultaneously examined to determine if a white line skip function is called for. The other video signals $I_2, \ldots I_n$ that are obtained by reading information prior to the reading operation for the information on the line to be transmitted, are applied to comparators $COMP_2, \ldots COMP_n$, respectively, in which the inputted video signals $I_2, \ldots I_n$ are compared with a reference signal to thereby decide whether or not the video signals contain a black signal. The decision results are produced from the comparators as outputs $O_2, \ldots O_n$. According to the present invention, applied to each of reference signal terminals of the comparators $COMP_2, \ldots COMP_n$ through a level adjusting circuit $C_3$ is a gain control signal Sc which is obtained by the circuits $C_1$ and $C_2$. With the above described circuit construction, it is possible to eliminate a reference signal source which is required in conventional devices, and further since the present reference signals being applied to the comparators are what have been subjected to background correction, black information can be detected with high accuracy in accordance with the output signals of the comparators. Accordingly, the present reader does not require a reference signal circuit having a complicated circuit construction. It should be noted that the level adjusting circuit $C_3$ is provided to adjust a signal level of the signal Sc and therefore it may be omitted if no level adjusting operation is required.

Figure 2:
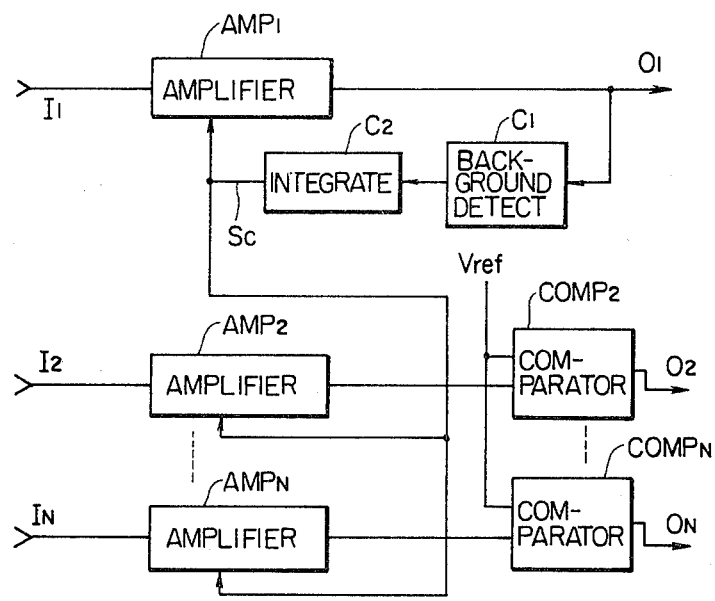
FIG. 2 is a circuit diagram showing another embodiment of the automatic background correction circuit.
Figure 3:
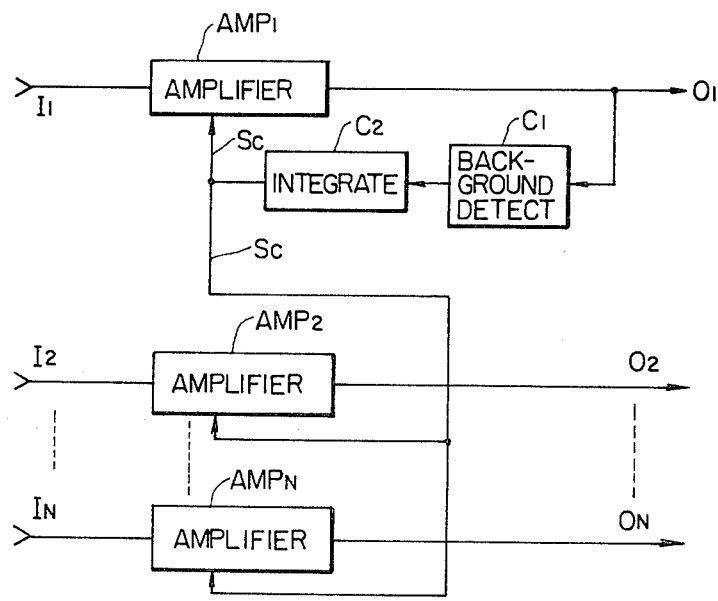
FIG. 3 is a circuit diagram showing a further embodiment of the present invention for carrying out functions other than white line detection.

FIG. 2 is a block diagram showing another embodiment of the present invention in which the video signals $I_2, \ldots I_n$ that are obtained by reading information prior to the reading operation for the information on the line to be transmitted, are also applied to variable gain amplifiers $AMP_2, \ldots AMP_n$, respectively, the amplifiers being similar to the variable gain amplifier $AMP_1$ as shown in FIG. 1. Heretofore, an automatic background correction circuit which was composed of the circuits $C_1$ and $C_2$, was provided to each of these amplifiers $AMP_2, \ldots AMP_n$. However, according to this embodiment of the invention, the gain control signal Sc obtained by the function of the first amplifier $AMP_1$ and the circuits $C_1$ and $C_2$ is applied to the gain control terminals of the variable gain amplifiers $AMP_2, \ldots AMP_n$, whereby an automatic background correction is accomplished in the respective amplifiers $AMP_2, \ldots AMP_n$. Consequently, there is no need to provide the automatic background correction circuits for each of the corresponding amplifiers $AMP_2, \ldots AMP_n$. Furthermore, by merely supplying a constant voltage signal to the respective reference input terminals of comparators $COMP_2$ through $COMP_n$ provided after the amplifiers, it is possible to detect the desired black information which has been subjected to the background correction treatment. As is apparent from the embodiment shown in FIG. 2, the present invention can be applied to a configuration where no comparators are employed, i.e. a configuration for carrying out operations other than the detection of white lines. Such an embodiment is shown in FIG. 3.

While the present invention has been described primarily with reference to the aforementioned correction circuit, it goes without saying that it is not intended to restrict the present invention thereto and the present invention is also applicable to an amplitude control circuit. As a result, the present invention can be applied to an original document reader capable of accomplishing both background correction and amplitude control. Further, the present invention is not intended to be limited to facsimile systems. More specifically, it can be effectively used in readers for a television system, a duplicator and the like. Moreover, the present invention may be applicable not only to a binary coded data processing device but also a processing device for analog data having halftone capability.

As is apparent from the above, according to the present invention, a correction and/or control circuit for one line is employed to deal with information on the respective remaining lines, thus leading to a reduction in the number of circuit elements and a decrease in both the scale of a circuit and the manufacturing cost thereof.

What is claimed is:

1. An original document reader capable of simultaneously scanning a first line and at least a second line on an original document to produce video signals corresponding to information read from each of said lines, comprising first video signal processing circuitry for said first line including processing means for processing first video signals from said first line in accordance with a control signal and means for generating said control signal in accordance with the said first line video signals, second video signal processing circuitry for processing second video signals from said at least second line in accordance with an input signal, and, said control signal applied to said second video signal processing circuitry as said input signal.

2. The original document reader as defined in claim 1 wherein said processing means for said first scanning line comprises an automatic background correction circuit and said second video signal processing circuitry does not include a background correction circuit.

3. The original document reader as defined in claim 2 wherein said second video signal processing circuitry comprises a comparator for receiving said second video signals and comparing them to a reference signal, said control signal being applied said comparator as said reference signal.

4. The original document reader as defined in claim 3, wherein said at least second line comprises a plurality of lines, said second processing circuitry including at least one comparator for each of said lines, and each of said comparators receives said control signal as said reference signal.

5. The original document reader as defined in any one of claims 1 2, 3 or 4, wherein said control signal is applied to said second video processing circuitry through a level adjustment.

6. The original document reader as defined in claim 2, wherein said second video signal processing circuitry comprises a variable gain amplifier for controlling the amplitude of said second video signals in accordance with an input signal received at its control terminal, said control signal being applied to said control terminal.

7. The original document reader as defined in claim 1 wherein said processing means comprises an automatic amplitude control circuit for controlling the amplitude of said first video signals in accordance with said control signal.

8. The original document reader as defined in claim 1, wherein said second video signal processing circuitry includes processing means identical to that in said first video signal processing circuitry but receives its control signal from said first video signal processing circuitry.

9. The original document reader as defined in claim 8, wherein both of said first and second video signal processing circuitry processing means comprise variable gain amplifiers.

* * * * *